(12) United States Patent
Miller

(10) Patent No.: US 7,114,258 B2
(45) Date of Patent: Oct. 3, 2006

(54) FRUIT STONE REMOVER

(76) Inventor: David William Miller, 2071 N. Sunny La., Reedley, CA (US) 93654

( * ) Notice: Subject to any disclaimer, the term of this patent is extended or adjusted under 35 U.S.C. 154(b) by 0 days.

(21) Appl. No.: 10/957,101

(22) Filed: Oct. 1, 2004

(65) Prior Publication Data

US 2006/0070241 A1 Apr. 6, 2006

(51) Int. Cl.
*A47J 23/00* (2006.01)
(52) U.S. Cl. .................. 30/113.2; 30/113.1; 30/174; 30/279.2; 30/301; 30/316; 30/352
(58) Field of Classification Search ............... 30/113.1, 30/113.2, 113.3, 173, 174, 278, 279.2, 301, 30/314, 315, 316, 352
See application file for complete search history.

(56) References Cited

U.S. PATENT DOCUMENTS

| 359,950 | A | * | 3/1887 | Wilcox | 30/121.5 |
| 1,646,564 | A | * | 10/1927 | Vaughan | 30/113.2 |
| 1,994,473 | A | * | 3/1935 | Jones | 99/546 |
| 3,936,934 | A | * | 2/1976 | Bowden | 30/113.2 |
| 4,690,047 | A | * | 9/1987 | Balzano | 99/542 |
| 4,934,053 | A | * | 6/1990 | Johnson | 30/135 |
| 5,492,021 | A | * | 2/1996 | Bourgeois et al. | 73/864.45 |
| 6,148,719 | A | * | 11/2000 | Poltielov | 99/544 |

* cited by examiner

*Primary Examiner*—Timothy V. Eley
(74) *Attorney, Agent, or Firm*—Greer, Burns & Crain, Ltd.

(57) ABSTRACT

A stone removing tool for removing a stone from a fruit having an outer flesh portion surrounding the stone, the tool having a head section configured for being gripped by a user and a stem section extending from the head section and having an end opposite the head section configured for penetrating the flesh of the fruit and positively engaging the stone for removal from the fruit in an axial pulling action.

21 Claims, 8 Drawing Sheets

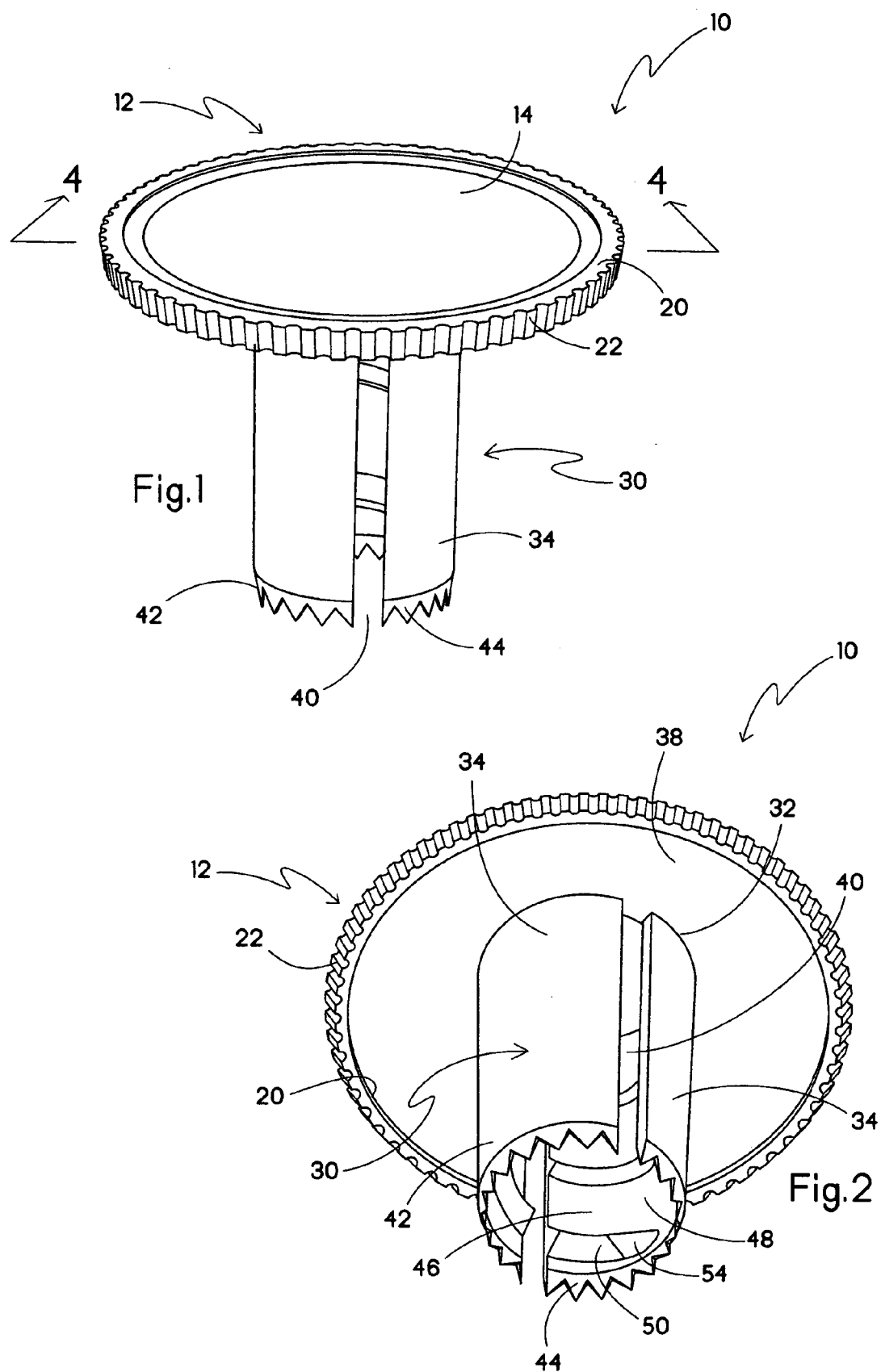

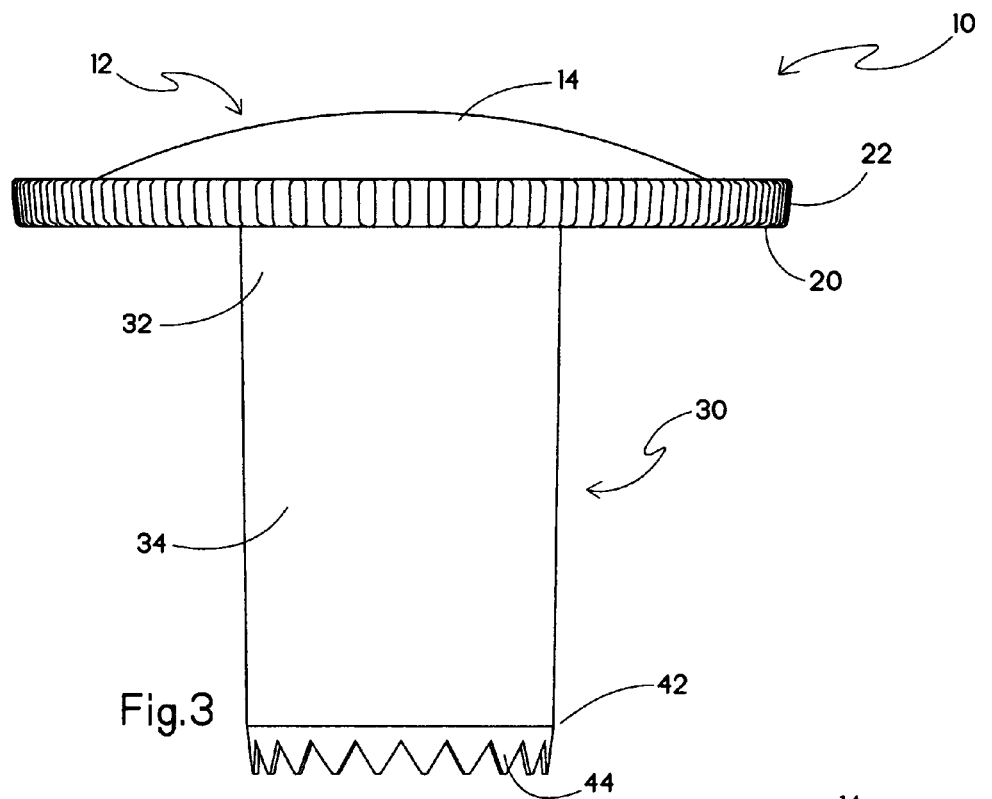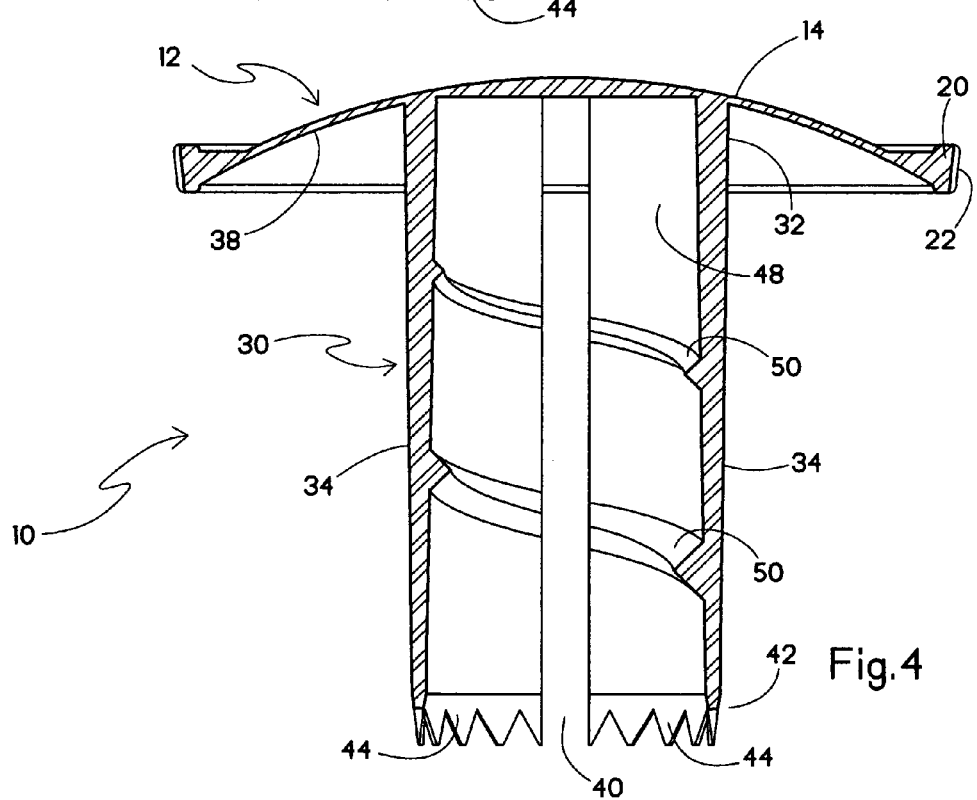

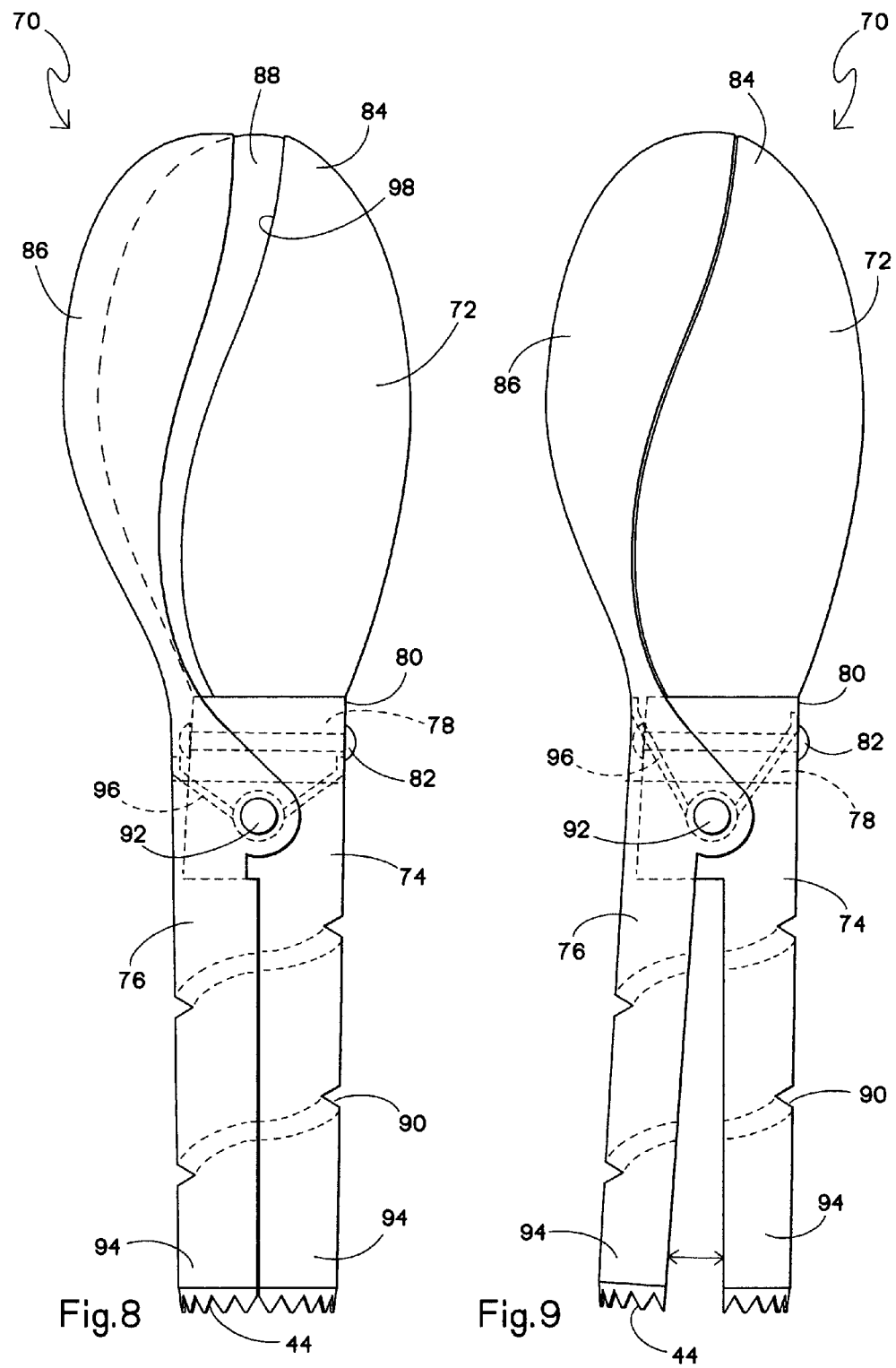

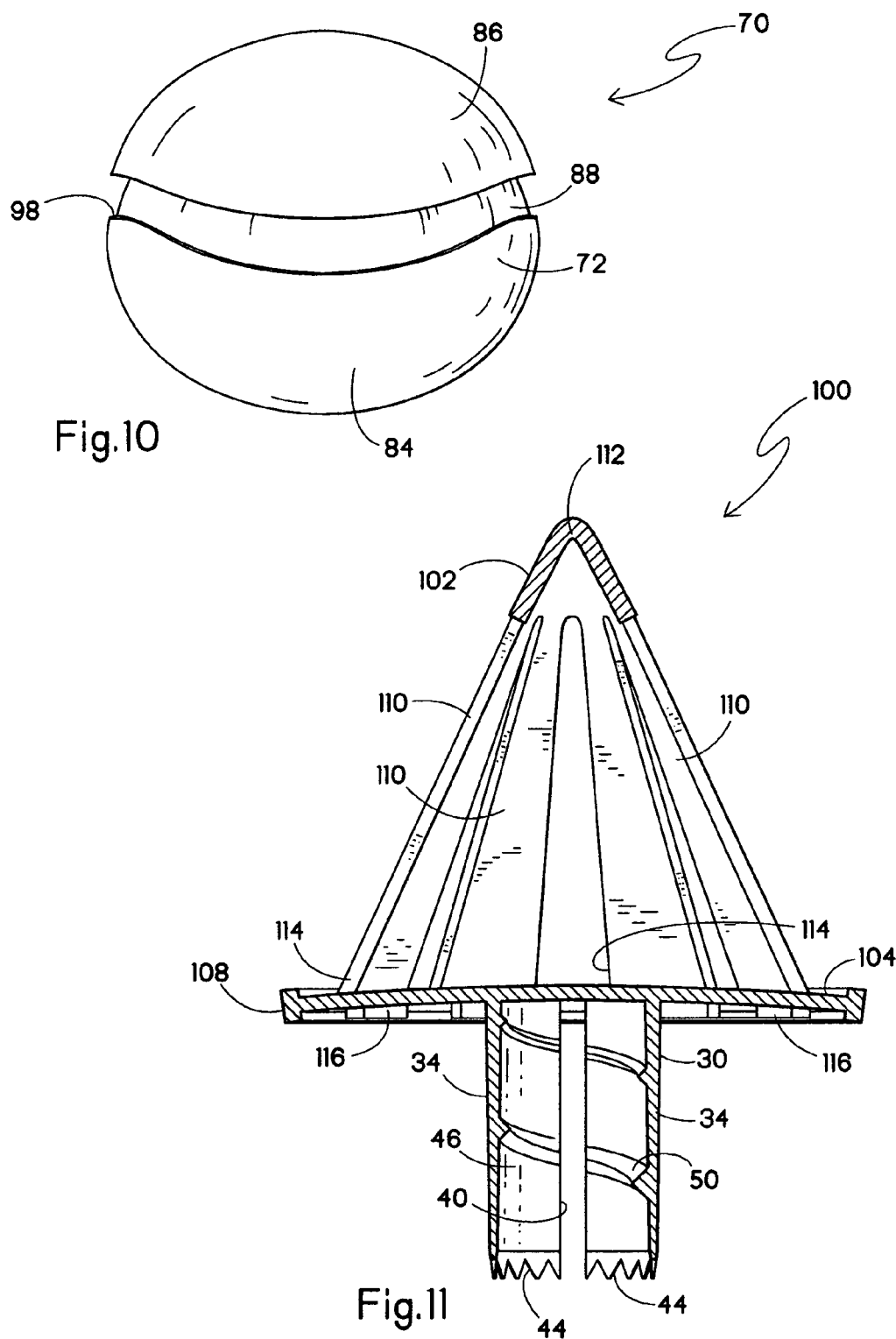

FRUIT STONE REMOVER

BACKGROUND OF THE INVENTION

The present invention relates to tools for removing stones from stone fruits, such as pitters and de-stoners. Such tools are generally used in residential kitchens, restaurants, and industrial food processing or handling applications. More specifically, the present invention relates to such a tool intended for use in pitting or de-stoning peaches, nectarines, plums and similar fruit.

The removal of pits, seeds, piths, or stones (hereinafter referred to as "stones") from the center of pitted fruit (hereinafter referred to as "pitting") traditionally requires cutting the fruit into pieces then manually removing the stone. In instances where a large quantity of pitted fruit must be prepared, removal of the stones can be cumbersome, messy, and/or tedious.

Cherry pitters are known for high-volume applications or in instances where the appearance of the cherry must be maintained. Cherry pitters generally employ a driver reciprocated in an axial direction, meaning through the longitudinal axis of a cherry from a stem end to an opposite bottom end, and a bottom member for holding the cherry in place. The driver pushes the seed out of the cherry and through a hole in the bottom member. Residential kitchen-use cherry pitters generally resemble a pair of pliers with a similar operation. Such residential pitters employ the reciprocating member extending from one plier jaw end and a cup-like member to hold the cherry on the other plier jaw end. Commercial cherry pitters utilize several drivers driven by a crank and a feeding system to allow for fast, high-volume pitting according to a similar operational principle.

As opposed to cutting out pits with a knife, cherry pitters allow for easy removal of the seed while maintaining the outer appearance of the cherry. Stone fruits, however, generally contain large stones with surfaces that are not smooth. Moreover, many stone fruits have clingstones that bind to the inner flesh of the fruit. The binding of the stones within the fruit and the rough surface of the stones prohibits the use of known seed pitters that push the pits out of the fruit. The problems with pitting stone fruit have deterred foodservice, institutional, and household users from using these fruits in recipes and other preparations. Removal of the stone prior to slicing the fruit would allow for easier subsequent slicing of the fruit along a variety of section lines or stuffing of the cavity while maintaining a consistent look of the fruit.

Stone pitters such as peach pitters are known in the art. Cannery workers typically use tools shaped like a spoon with a sharp, pointed end similar to a grapefruit spoon. Peach pitters allow users to dig out the stone from the stem end of the fruit. The use of such pitting tools often damages the flesh of the fruit.

Another disadvantage of such tools is lack of control of the amount of flesh removed. Conventional peach pitting tools often require the user to cut away excess flesh to access and remove the stone. Moreover, such labor-intensive tools are time-consuming and cumbersome.

Due to the problems mentioned above, there is a need for an easy-to-use, safe stone remover that allows for extraction of a stone while avoiding waste of flesh or cosmetic damage to the fruit.

BRIEF SUMMARY OF THE INVENTION

The above-listed needs are met or exceeded by the present fruit stone removing tool. A main feature of the present stone removing tool is a stem section extending from a head section and configured for cutting into a fruit and expanding around a stone. The stem section further includes at least one helical rib opposing the stone surface for facilitating axial movement of the stone relative to the fruit. The head section is configured for facilitating secure grasping by a user and providing leverage for an axial rotating action relative to the fruit. In addition, the head section is designed to easily release or eject the stone out of the stem section after removal from the fruit. It has been found that application of the present tool results in relatively rapid removal of stones from fruit, reduced cosmetic damage to the fruit, and a reduction in wasted flesh. The present tool has relatively few parts and as such is easy-to-clean.

More specifically, a stone removing tool is provided for removing a stone from a fruit having an outer flesh portion surrounding the stone, the tool having a head section configured for being gripped by a user, and a stem section extending from the head section and having an end opposite the head section configured for penetrating the flesh of the fruit and positively engaging the stone for removal from the fruit in an axial pulling action.

BRIEF DESCRIPTION OF THE SEVERAL VIEWS OF THE DRAWINGS

FIG. 1 is a top perspective view of a first embodiment of the present stone removing tool;

FIG. 2 is a bottom perspective view of the stone removing tool of FIG. 1;

FIG. 3 is a front elevation of the stone removing tool of FIG. 1;

FIG. 4 is a cross-section taken along line 4—4 of FIG. 1 and in the direction indicated generally;

FIG. 8 is a side elevation of a second embodiment of the present stone removing tool in a closed position;

FIG. 9 is a side elevation of the stone removing tool of FIG. 8 shown in the open or stone-ejection position;

FIG. 10 is a rear end elevation of the stone removing tool of FIG. 8;

FIG. 11 is a vertical section of a third embodiment of the present stone removing tool.

DETAILED DESCRIPTION OF THE INVENTION

Figure 5:
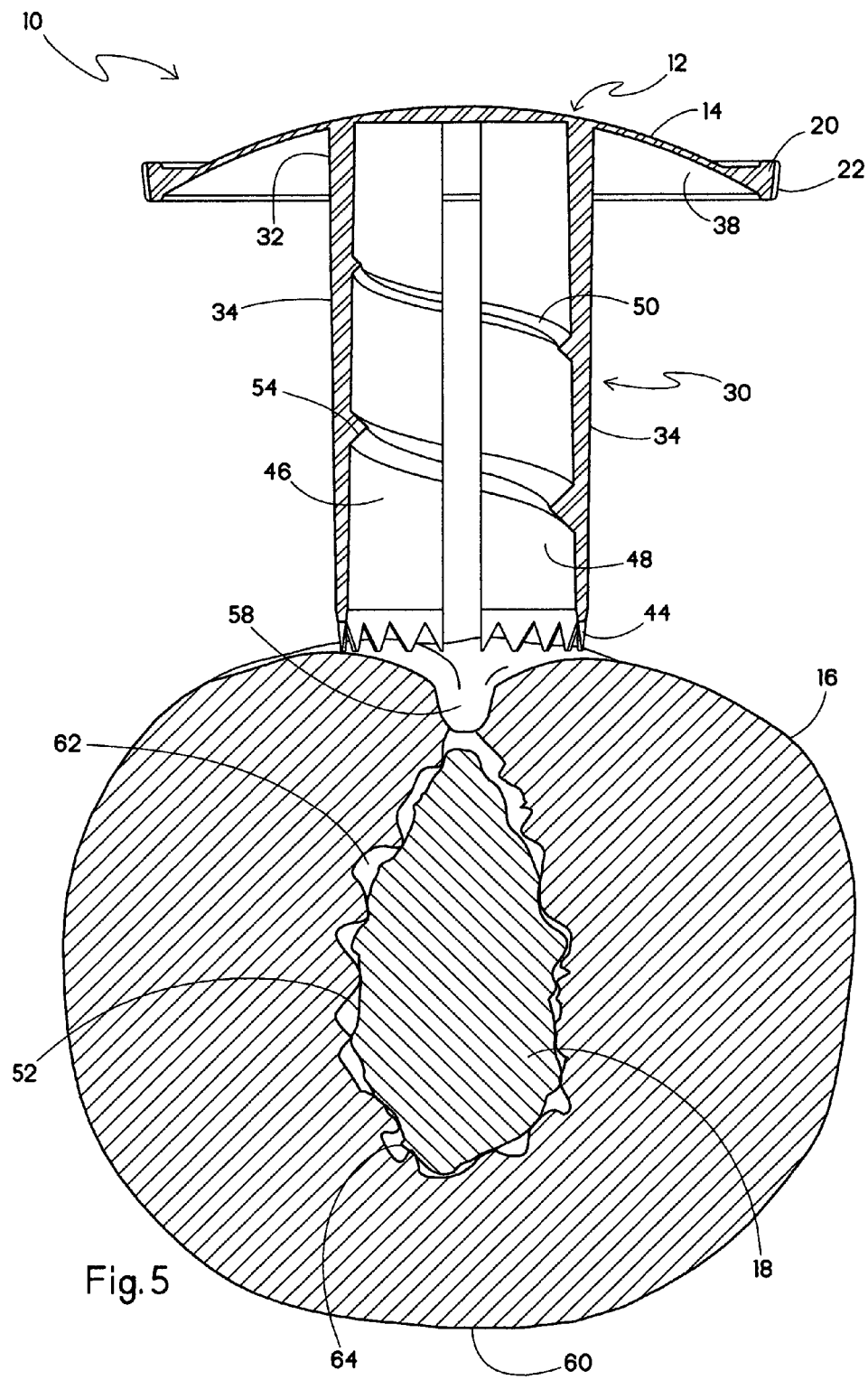
FIG. 5 is a vertical cross-section of the stone removing tool of FIG. 1 shown at the point of penetrating a stone fruit.

Referring now to FIGS. 1–4, the present fruit stone removing tool is generally designated 10 and includes a head section 12, which is generally in the shape of a cap (best seen in FIG. 3). The head section 12 preferably includes a dome portion 14. The dome portion 14 is preferably composed of a material with sufficient elastic properties to allow "popping" or flexing action but still having sufficient rigidity to allow the tool 10 to penetrate a piece of fruit 16 and withdraw a stone 18 (seen in FIGS. 5–7). Surrounding the dome portion 14 is preferably a peripheral lip 20 with knurls 22 on the gripping surface. The lip 20 preferably has a wider or thicker cross-section than the dome portion 14 to provide a sufficient positive gripping surface area. The knurls 22 enable a user to more easily twist or rotate the head section 12. It is also contemplated that, instead of the knurls 22, the lip 20 of the head section 12 is variable in construction and can be composed of a material with a high coefficient of friction, or the head section can have a checkered or other textured formation to facilitate gripping.

Referring now to FIGS. 1 and 2, a stem section, which is generally designated 30, is associated with the head section 12 at an upper end 32. The stem section 30 extends from the head section 12 and preferably has a substantially smooth outer surface to avoid unnecessary disfiguration of the flesh of the fruit to be de-stoned. As is known in the art, the stem section 30 may be bonded to the head section 12 using chemical adhesives, ultrasonic bonding or the like, or both sections may be integrally formed as a single piece.

The stem section 30 is preferably composed of two opposing arms 34 depending from an underside 38 of the dome 14 (best seen in FIG. 2). The arms 34 extend from the head section 12 in an axial direction and define a substantially cylindrical tube separated into two halves by a slit 40. The stem section 30 may also be composed of a full or partially solid tube shape without the slit 40; however, the stem section preferably has a substantially circular shape to allow the tool 10 to avoid binding on the flesh when being rotated in the fruit 16.

An end 42 of the stem section 30, opposite the head section 12, is configured for penetrating the flesh of the fruit 16 and positively engaging the stone 18 for removal from the fruit in an axial pulling action. The end 42 preferably has at least one sharpened tooth 44 opposing the fruit 16 to saw or slice the flesh of the fruit 16 while avoiding unnecessary damage to the fruit. In the preferred embodiment, the entire circumference of the end 42 is provided with a ring of spaced, generally wedge-shaped teeth 44. The end 42 may also have a sharp or serrated end or any other known shape to allow for cutting, incising, or sawing the flesh and penetrating a surface of the fruit 16.

Referring to FIG. 2, the at least two opposing arms 34 define a hollow, substantially cylindrical cavity 46, which is configured for positively engaging the stone 18 (shown in FIG. 5). The hollow cavity 46 has a diameter approximately equal to a diameter of the stone 18. It is preferable, however, for the diameter of the cavity 46 to be slightly smaller than the diameter of the largest stone 18 but dimensioned to accommodate a variety of stone sizes of a particular type of fruit 16. The cavity 46 should be narrow enough so that, as the tool 10 is axially rotated and pressed upon the fruit 16, the stem section 30 frictionally engages the stone 18. Preferably, the stem section 30 expands around the stone 18 and retains the stone with an interference fit.

The at least two opposing arms 34 of the stem section 30 each preferably have an inner surface 48 with at least one helical rib 50 formed thereon, the surface of the ribs 50 opposing the stone 18 to be grasped in the arms. As is known in the art, the ribs 50 may be a single rib or a plurality of such ribs with varying angles and/or densities of ribs per inch depending on the application.

Referring now to FIG. 4, the ribs 50 spiral in a helical shape along the inner surface 48 of the stem section 30 to allow the stone removing tool 10 to be rotated into the fruit sufficiently to grasp the stone 18. As the tool 10 is inserted into the fruit 16, the ribs 50 wind around an outer surface 52 of the stone 18, and the cavity 46 expands to engage the stone. The ribs 50 preferably have a triangular or wedge-shaped cross-section; however, any shape known in the art may be employed, including threads, conical sections, and polygonal sections. If the cross-section of ribs 50 has a shallow angle relative to the inner surface 48 of stem section 30, the ability of the tool 10 to impart an axial force towards the insertion point on the stone surface 52 relative to the fruit 16 will be diminished. The cross-section of the ribs 50 must also allow the ribs to easily cut through the flesh as the tool 10 is twisted into the fruit 16.

The arms 34 of stem section 30 preferably have tapering cross-sections from the head section 12 to the opposite end 42 (best seen in FIG. 4). The non-uniform cross-section of the arms 34 allows the arms to flex apart from each other at opposite ends 42 when contacting the stone 18 while remaining more rigid at the upper ends 32 near the head section 12. Also, this tapered construction provides a radially inward biasing force exerted by the arms 34 against the stone 18. Depending on the application, the arms 34 may also have a more rigid, uniform cross-section as long as the stone 18 is captured within the cavity 46.

One skilled in the art will also recognize the desirability of associating stem section 30 with the head section 12 to allow the hollow cavity 46 to expand around the stone 18. For example, the stone removing tool 10 may include a dome portion 14 composed of an elastomeric material or attachment of the arms 34 to the head 12 using a non-rigid structure so the arms 34 move apart from each other when in contact with the stone 18.

The slit 40 serves two purposes. First, the slit 40 further enhances the nature of the movement of the arms 34 away from each other and radial widening of the cavity 46 upon engagement with the stone 18. Second, the slit 40 allows desirable materials and liquids trapped within the cavity 46 during extraction of the stone 18 to escape back into the fruit 16. In the alternative, the stem section 30 may also include holes or slots to allow liquid to pass freely therebetween.

Referring now to FIG. 5, the stone fruit 16 contains the stone 18. The stone fruit 16 may be any variety of clingstone or freestone fruits as well as seeded fruits such as peaches and nectarines, but the stone removing tool 10 may also be used for plums, apricots, and any other fruits which contain an inedible inner core. The stone removing tool 10 may also be used to remove hard, rotten, or unpleasant tasting cores from particular types of fruit. It is appreciated that the stone removing tool 10 may accommodate removal of the inner core or pit from a variety of fruit types by adjusting the overall size and dimensions of the tool 10 and/or simply the diameter of the stem section 30 and hollow cavity 46 to accommodate the desired core to be removed according to the type of fruit.

In operation and referring now to FIG. 5, the user twists or axially rotates the stone removing tool 10 into a stem end 58 of a fruit 16 while pressing the tool in an axial direction, meaning from the stem end to a bottom end 60 of the fruit 16. The twisting action of the tool 10 allows the teeth 44 to cut into the flesh of the fruit 16. The same operation may be executed from the bottom end 60 of the fruit 16 as well.

As the stem section 30 progresses axially into the fruit 16, the ribs 50 on the inner surface 48 of the arms 34 will cut into the fruit flesh. The ribs 50 preferably are configured to rotate into the fruit 16 in a clockwise direction and partially stabilize the tool 10 inside the fruit 16. However, configuration for counter-clockwise rotation is contemplated depending on the application. The arms 34 of the stem section 30 will also stabilize the tool 10 within the fruit 16. The ribs 50 and stem section 30 will not completely self-stabilize and self-align the tool 10, so the user should align and twist the tool 10 into the fruit 16 in an axial direction.

Figure 6:
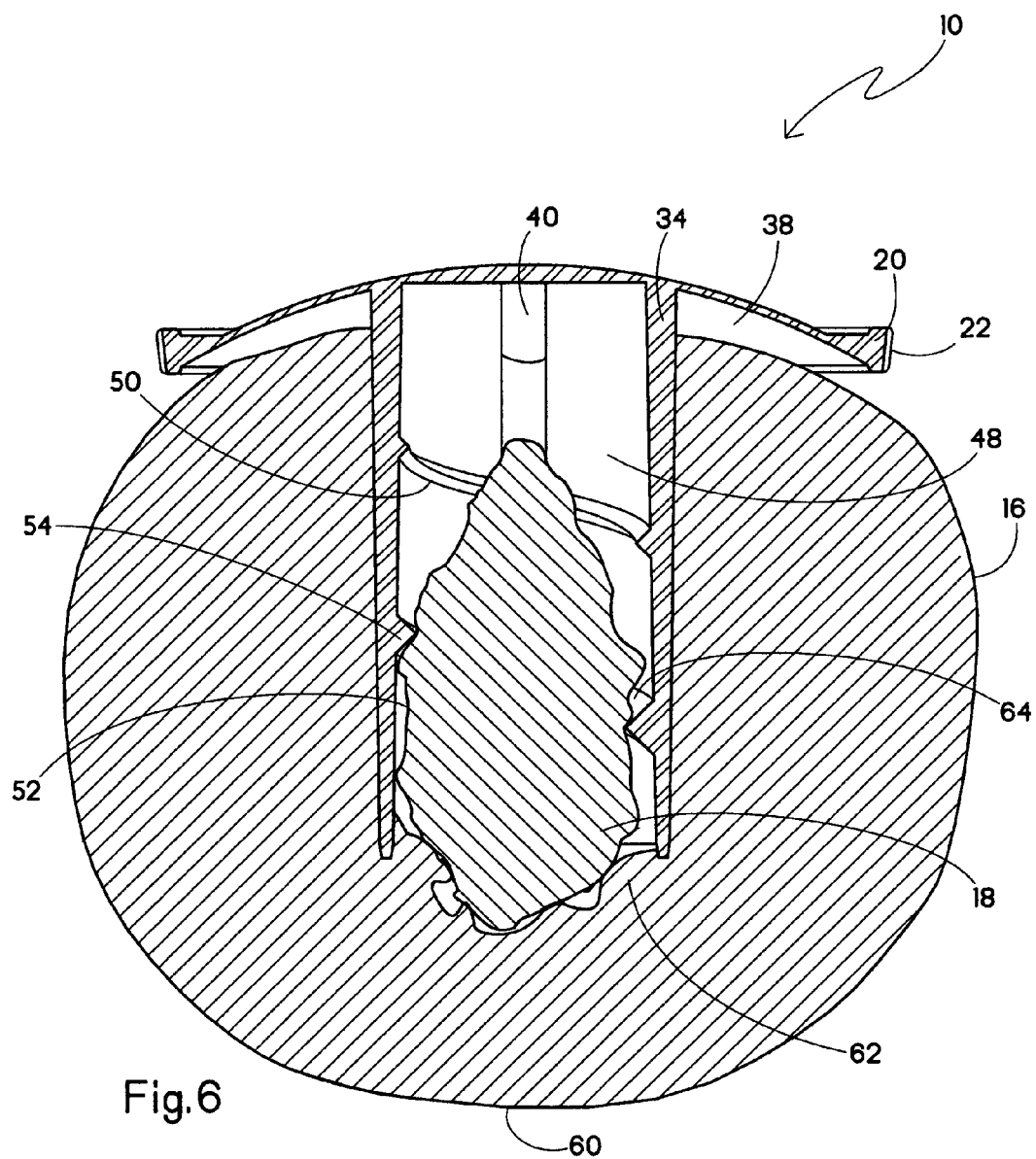
FIG. 6 is a vertical cross-section of the stone removing tool of FIG. 1 having penetrated the fruit and grasping a stone within the fruit.

Referring now to FIG. 6, the user twists the tool 10 so the head section 12 approaches the stem end 58 of the fruit 16. In the alternative, the stone removing tool 10 may be pushed instead of twisted into the fruit 16, and the stem section 30 and ribs 50 may be popped over the stone 18. The user probes the tool 10 deep enough into the fruit 16 so that the arms 34 separate a sufficient part of the clinging flesh from the stone 18 to allow for its removal. In this fully inserted position, the arms 34 will have surrounded and separated a portion of the stone's outer surface 52 from the inner flesh and grasped the stone 18.

Preferably, the arms 34 have a length generally corresponding to a distance from a stem end 58 of the fruit 16 to a bottom end of the stone 18 such that the under surface 38 of the dome portion 14 will nearly bottom out on the stem end 58 in the fully inserted position. Variations in the length of the arms 34 are contemplated to give the user an indication of how far to insert the tool 10 into the fruit 16. The arms 34 should not fully pass through the fruit 16 beyond a pit cavity 62 to avoid removing excess flesh or damaging the appearance of the fruit 16.

In this fully inserted position, the ribs 50 partially surround the stone 18 and frictionally contact rough ridges 64 and clinging flesh on the stone's outer surface 52 so that the stone 18 will be extracted or pulled out with the tool 10 upon exertion of an upward axial force on the stone 18.

Once the tool 10 has reached the fully inserted position, the user extracts the tool 10 by pulling up on the head section 12. When the user pulls on the head section 12, the ribs 50 exert an axial pulling force on the stone 18 and flesh grasped within the arms 34. The head section 12 may also include hooks or tabs (not shown) to allow for easier pulling action. When the tool 10 is pulled from the fruit 16, the stone 18 will be removed and remain inside the hollow cavity 46. The flesh between the stem end 58 and the stone 18 will be removed, and the amount of flesh wasted will thus be reduced. Waste juice and flesh will also have been reduced as well as any mess created by the stone removing process. The flesh clinging to the bottom portion of the stone 18 may however be torn from the fruit core because the stem section 30 does not penetrate the area below the stone 18.

Figure 7:
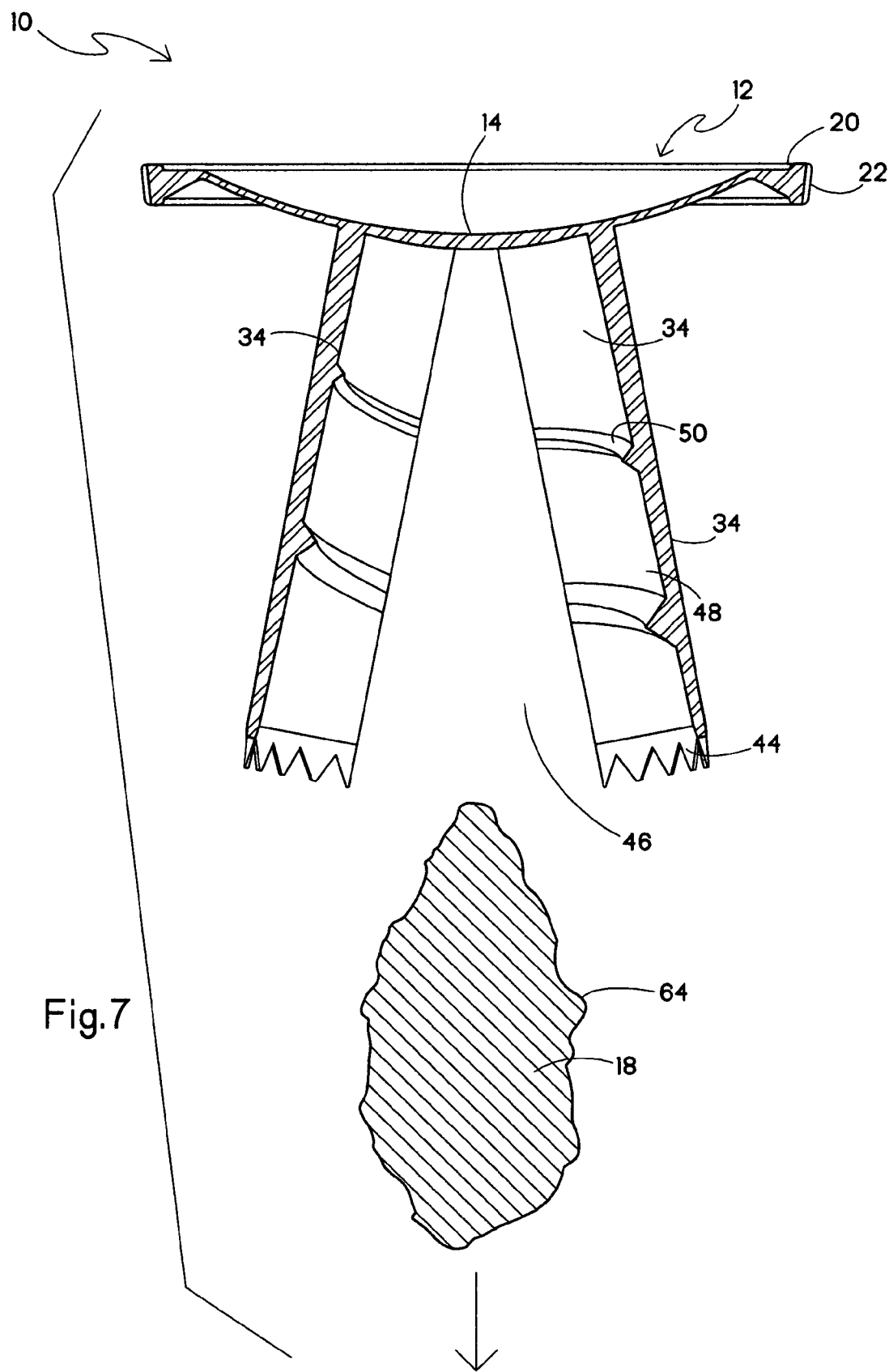
FIG. 7 is a vertical cross-section of the stone removing tool of FIG. 1 ejecting the stone after removal from the fruit.

Referring now to FIG. 7, when the tool 10 is extracted from the fruit 16, the stone 18 and waste flesh above the stone will remain in the hollow cavity 46 due to a combination of the biasing force exerted by the arms 34 and the gripping action of the ribs 50. A feature of the tool 10 is that it allows for easy ejection of the stone 18 and other waste by "popping" the head section 12. In the normal or resting state and during insertion into the fruit 16, the dome portion 14 of the head section 12 has a convex, dome shape. By pushing against the dome portion 14, the user can "pop" the dome portion 14 into an inverted, substantially concave shape while the peripheral lip 20 remains rigid. The relatively thin cross-section of the dome portion 14 allows it to be readily flexed in this manner. The thickness of dome portion 14 may vary to suit the application, provided such flexing action is achieved.

When the dome portion 14 has popped into a concave shape, it will be pointing downward towards the fruit 16, and what was the top surface of the head section 12 in the resting state will extend below a plane defined by the lip 20 to spread apart ends 42 of the arms 34. The arms 34 thus move radially outwardly apart from each other, thus releasing the contents grasped within the hollow cavity 46. The present stone removing tool 10 thus allows for easy removal of the stone 18 and depositing of the stone in a waste receptacle.

While in the preferred embodiment the dome portion 14 of the head section 12 is depicted with a dome-like shape, it is appreciated that other configurations will allow for the popping action of the head section and spreading apart of the stem section 30. Once the stone 18 is released, the head section 12 is moved back to the convex position of FIG. 5 for another stone extraction. It is further appreciated that other means may be employed for releasing the stone 18 from within the stem section 30 such as by use of a plunger reciprocating through the head section 12 and cavity 46 pushing the stone 18 out of the cavity.

Referring now to FIGS. 8–10, an alternate embodiment of the tool 10 is generally designated 70. Shared components with the tool 10 have been designated with identical reference numbers. Basically, the tool 70 is designed for commercial, heavier use applications, and includes a head section in the form of a solid, preferably wooden or plastic handle 72 which is mounted to a stem section formed by a pair of metal arms 74, 76. The handle has a stub end 78 inserted into a handle end 80 of the arms and retained to the arm 74 by a rivet 82 or other suitable fastener. A gripping end 84 of the handle is contoured to comfortably fit into a user's hand.

Instead of being made of plastic, it is preferred that the arms 74, 76 are made of stainless steel or other suitably durable and corrosion-resistant material suitable for food-service food preparation. As described above, the first arm 74 is relatively shorter than the second arm 76 and is secured to the handle 72. The second arm 76 is relatively longer than the first arm 74 by virtue of a lever end 86 which extends over the gripping end 84. In the preferred embodiment, the lever end 86 is contoured to fit over the gripping end 84 which is provided with a recessed portion 88 for accommodating the lever end in a stone-release position (best seen in FIG. 9).

As is the case with the arms 34, both of the arms 74, 76 are provided with sharpened teeth 44 or other suitable formations for more effectively cutting into the fruit 16. Also, similar to the molded helical ribs 50, the arms 74, 76 are provided with wedge-shaped helical ribs 90 which are preferably stamped into the arms to project radially inwardly, however other suitable fabrication techniques are contemplated. The arms 74, 76 pivot relative to each other at a pivot point 92, preferably a pin passing through corresponding throughbores in the arms as is known in the mechanical arts.

It is contemplated that the arms 74, 76 will be biased toward each other in the rest position (FIG. 8) so that the toothed ends 94 are in contact with each other, and the lever end 86 is spaced from the gripping end 84 of the handle 72. This biasing force can be provided by a number of known mechanical devices or manufacturing techniques, one of which is to provide a spring 96 (shown hidden) disposed about or in close proximity to the pivot point 92 and engaging corresponding locations on each of the arms 74, 76.

In operation, the tool 70 operates similarly to the tool 10. A pushing, twisting action causes the tool to be inserted into the fruit 16, and the axial twisting or rotation causes the arms 74, 76 to threadably engage the stone 18 as described above in relation to FIGS. 5 and 6. The ribs 90 engage the stone 18 in the same manner as the ribs 50. A main difference in the operation of the tools 10 and 70 is that in the latter unit, to release the captured and extracted stone 18 once the tool is removed from the fruit, the lever end 86 is compressed or squeezed against the gripping end 84, thus overcoming the biasing force exerted on the arms 74, 76 and releasing the stone (FIG. 9). The lever end 86 preferably comes to a stop at a complementary ridge 98 on the gripping end 84 (FIG. 10). Once the stone 18 is released, the user releases the grip on the lever end 86, and the tool 70 resumes the position shown in FIG. 8.

Figure 12:
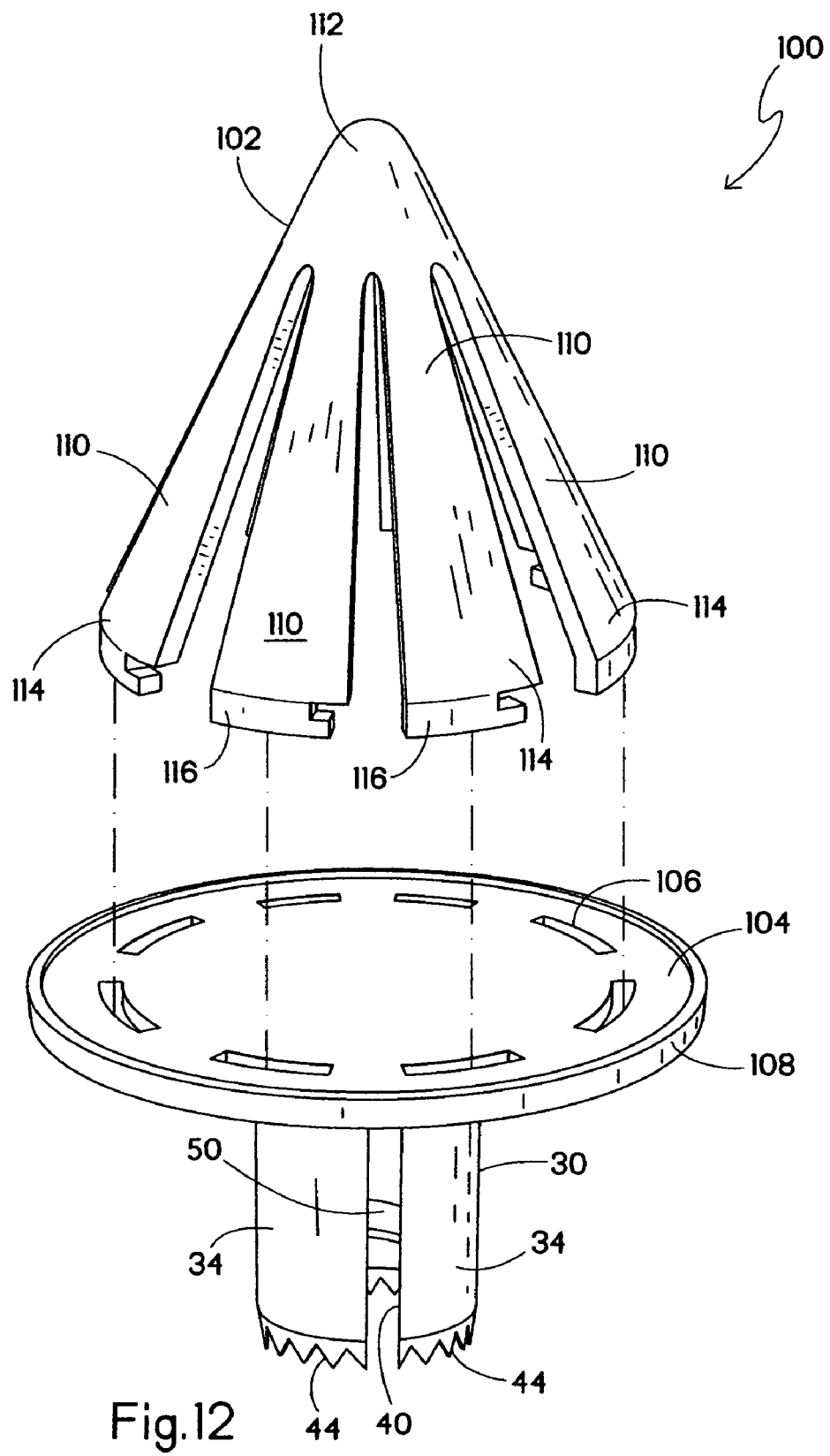
FIG. 12 is an exploded perspective view of the stone removing tool of FIG. 11.

Referring now to FIGS. 11 and 12, another alternate embodiment of the present stone removing tool is generally designated 100. Shared components of the tools 10 and 70 are designated with identical reference numbers. The tool 100 is designed for use with smaller fruits such as plums and apricots, and is provided in reduced relative dimensions as needed to correspond with fruit size. A feature of the stone removing tool 100 is that once it is inserted into the fruit 16, an axially projecting handle 102 can be used to hold the fruit while it is being eaten.

The stone removing tool 100 is very similar in construction to the tool 10 in that it is preferably made of molded plastic. In fact, the stem section 30 and the arms 34 in both units are virtually identical in configuration, however size variations are contemplated to correspond to fruit size. Instead of the dome section 14, the lip 20 and the knurls 22, the tool 100 is provided with a generally planar, slightly convex head section 104 including the handle 102 secured to the arms as in the tool 10 and having a plurality of annularly disposed, spaced slots 106. The slots are spaced radially inwardly from a peripheral edge or lip 108 and are configured for receiving the handle 102 as described below.

Preferably conical in overall shape, the handle 102 is contemplated has being provided in any acceptable shape which facilitates gripping of the captured fruit. The handle 102 is provided with a plurality of spaced legs 110 joined together at a common upper end 112. Each leg 110 is configured to widen as it reaches an opposite or fastening end 114, but that is due to the conical shape, and may vary with the shape of the handle 102. At the fastening end 114, each leg 110 is preferably provided with a fastening formation 116 configured for engaging corresponding one of the slots 106. In the preferred embodiment, the fastening formations are slotted tabs which are inserted and then frictionally engage edges of the slots 106 as the handle 102 is axially rotated. Other manufacturing techniques are contemplated for attaching the handle 102 to the head section 104.

In operation, the stone removing tool 100 is inserted into the fruit 16 and grasps the stone 18 as described above in relation to the tool 10. An added advantage in this embodiment is that the user can eat the fruit 16 while the tool 100 is attached, by holding the handle 102. Once the user desires to remove the stone from the arms 34, the spaced legs 110 of the handle 102 are compressed or squeezed radially inwardly, which causes the planar head section 104 to bow out relative to its rest position (FIG. 11), separating the arms. As a result of this movement, the stone 18 is released.

While the present tool has been depicted as a single, small device, it is appreciated that the present tool may also be used as part of a larger industrial device employing several tools simultaneously and/or driving cranks like those used in industrial cherry pitters to drive the tool. While particular embodiments of the present fruit stone removing tool have been shown and described, it will be appreciated by those skilled in the art that changes and modifications may be made thereto without departing from the invention in its broader aspects and as set forth in the following claims.

The invention claimed is:

1. A stone removing tool for removing a stone from a fruit having an outer flesh portion surrounding the stone, comprising:

a head section configured for being gripped by a user; and a stem section extending from said head section and having an end opposite said head section configured for penetrating the flesh of the fruit and positively engaging the stone for removal from the fruit in an axial pulling action;

wherein said stem section comprises at least two opposing arms extending in an axial direction and defining a hollow, substantially cylindrical cavity configured for positively engaging the stone;

wherein said at least two opposing arms have an inner surface with at least one helical rib for opposing the surface of the stone.

2. The stone removing tool of claim 1 wherein said hollow cavity has a diameter approximately equal to a diameter of the stone.

3. The stone removing tool of claim 1 wherein said stem section is associated with said head section so as to allow said hollow cavity to expand around the stone.

4. The stone removing tool of claim 1 wherein said at least two opposing arms have tapering cross-sections from said head section to said end opposite said head section.

5. The stone removing tool of claim 1 wherein said arms are each joined at one upper end to said head section such that flexing of said head section causes movement of said arms apart from each other.

6. The stone removing tool of claim 1 wherein said at least two arms have a length generally corresponding to a distance from a stem end of the fruit to a bottom end of the stone.

7. The stone removing tool of claim 1 wherein said end of said stem section includes cutting or sawing means for penetrating the flesh of the fruit.

8. The stone removing tool of claim 7 wherein said end has a sharp edge configured for penetrating the fruit.

9. The stone removing tool of claim 7 wherein said end further includes at least one tooth configured for penetrating the fruit.

10. The stone removing tool of claim 1 wherein said at least one rib has a wedge-shaped cross-section.

11. The stone removing tool of claim 1 wherein said head section includes a means for releasing a stone grasped within said stem section.

12. The stone removing tool of claim 1 wherein said stem section includes a relatively longer arm with a lever end extending adjacent a handle.

13. The stone removing tool of claim 12, wherein said stem section includes a biasing element for biasing said longer arm against a relatively shorter arm.

14. The stone removing tool of claim 1 further including a handle configured for being gripped by a user and operationally associated with said stem section.

15. The stone removing tool of claim 14 wherein said handle is compressible for releasing a captured fruit stone.

16. A stone removing tool for removing a stone from a fruit having an outer flesh portion surrounding the stone, comprising:

a head section configured for being ripped by a user; and a stem section extending from said head section and having an end opposite said head section configured for penetrating the flesh of the fruit and positively engaging the stone for removal from the fruit in an axial pulling action:

wherein said stem section comprises at least two opposing arms extending in an axial direction and defining a hollow, substantially cylindrical cavity configured for positively engaging the stone; and said head section has a substantially convex dome portion and a lip along an outer periphery, said dome portion is configured to be pushed into a substantially concave shape wherein a top surface of said dome portion extends below a plane defined by said lip to spread apart ends of said at least two opposing arms.

17. The stone removing tool of claim 16 wherein an outer circumferential surface of said lip includes means for improving gripping of the surface.

18. The stone removing tool of claim 17 wherein said outer circumferential surface of said lip has knurls.

19. A stone removing tool for removing a stone from a fruit having an outer flesh portion surrounding the stone, comprising:
   a head section having a knurled gripping surface;
   at least two opposing arms extending from said head section and forming a hollow, substantially cylindrical cavity configured for engaging the stone whereby a portion of an inner surface of said at least two opposing arms includes at least one helical rib opposing the stone surface, said at least two opposing arms having an end opposite said head section configured for penetrating the flesh of the fruit in an axial direction; and
   said head section being configured for flexing from a convex to a concave shape to release the stone from said cavity.

20. A stone removing tool for removing a stone from a fruit having an outer flesh portion surrounding the stone, comprising:
   penetration means for penetrating an outer surface and flesh of the fruit in an axial direction;
   grasping means associated with said penetration means for grasping the stone within the fruit, wherein said grasping means are biased closed said grasping means include at least two opposing arms extending in an axial direction and having an inner surface with at least one helical rib for opposing the surface of the stone;
   pulling means connected to said grasping means for pulling the stone in an axial direction; and
   releasing means associated with said grasping and pulling means for releasing the stone after pulling the stone from the fruit.

21. The stone removing tool of claim 20 wherein the releasing means imparts a popping action on the pulling means to eject the stone from the grasping means.

* * * * *